Dec. 7, 1948.                W. O. SCHULTZ                2,455,704
                            ELECTRICAL CUTOUT
Original Filed March 6, 1946                           5 Sheets—Sheet 1

INVENTOR.
WILLIAM O. SCHULTZ
BY
ATTORNEY.

Dec. 7, 1948.    W. O. SCHULTZ    2,455,704
ELECTRICAL CUTOUT

Original Filed March 6, 1946    5 Sheets-Sheet 2

INVENTOR.
WILLIAM O. SCHULTZ
BY
Arthur R. Woolfolk
ATTORNEY.

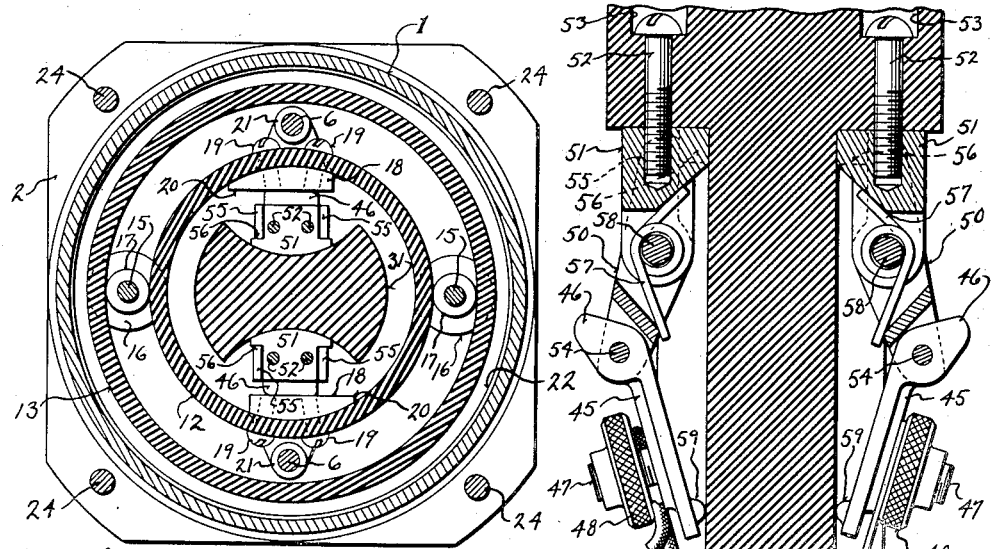
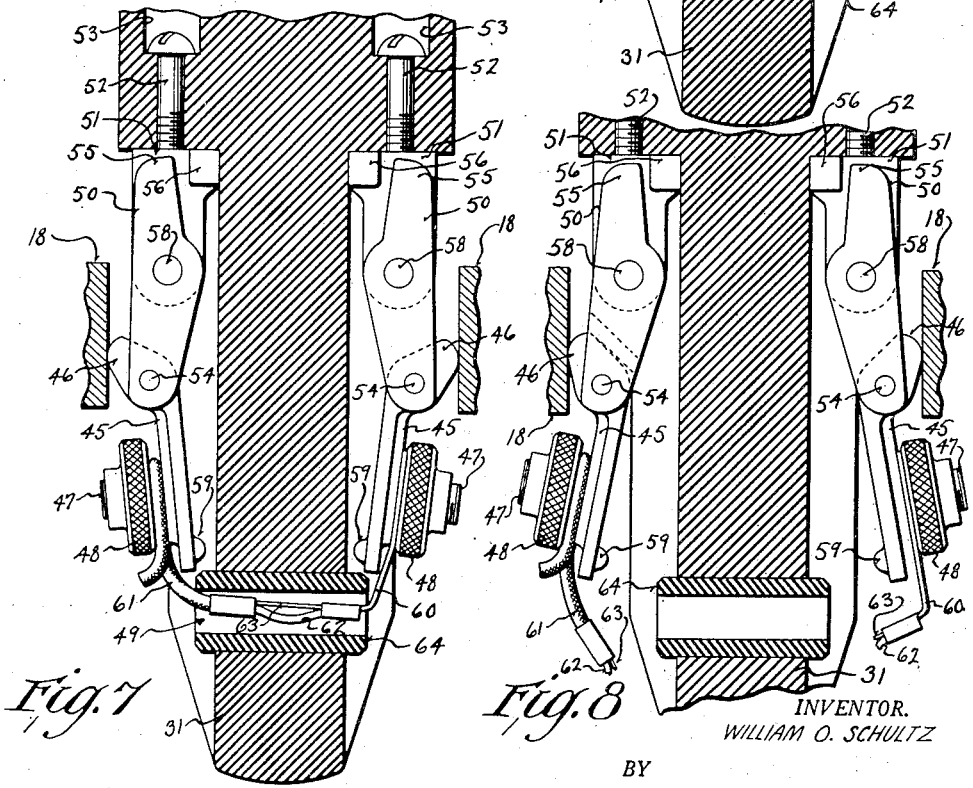

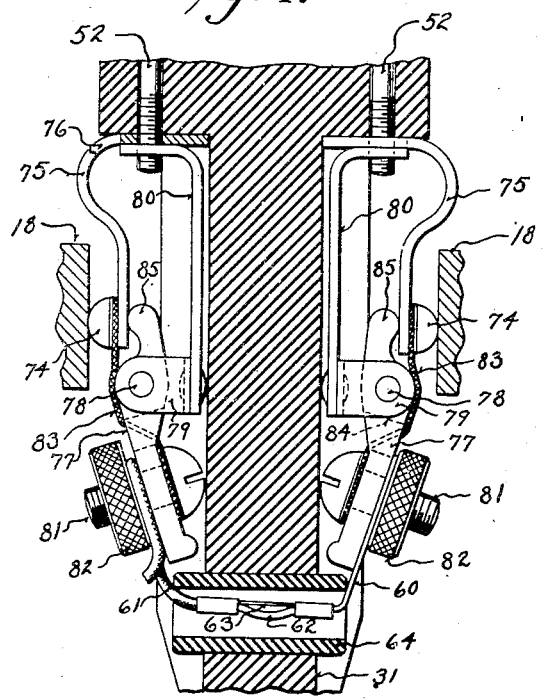
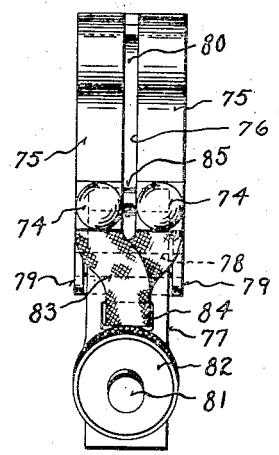
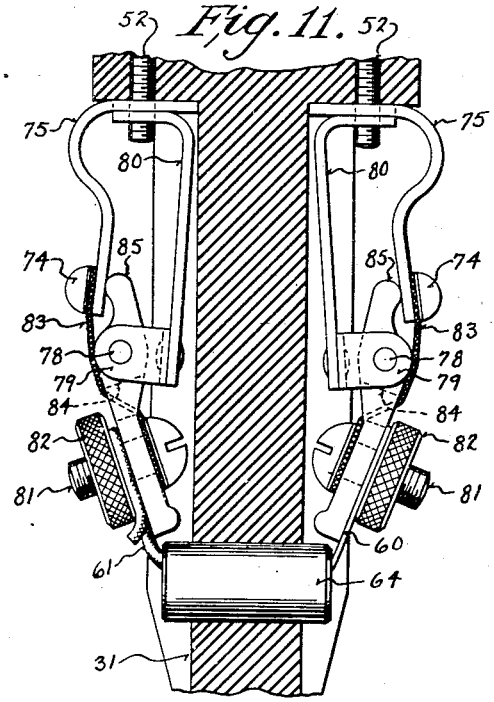
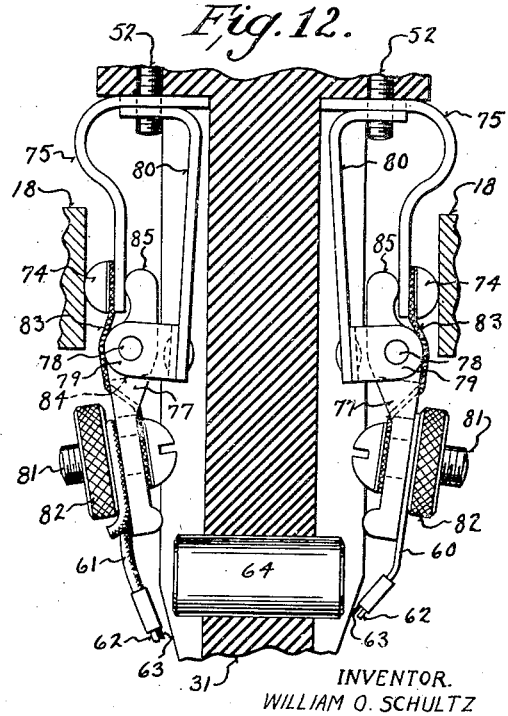

Patented Dec. 7, 1948

2,455,704

UNITED STATES PATENT OFFICE 2,455,704

ELECTRICAL CUTOUT

William O. Schultz, South Milwaukee, Wis., assignor to Line Material Company, Milwaukee, Wis., a corporation of Delaware Original application March 6, 1946, Serial No. 652,323. Divided and this application September 10, 1947, Serial No. 773,125

3 Claims. (Cl. 200—150)

This invention relates to electrical cut-outs and is particularly directed to oil fuse cut-outs.

This application is a division of my copending application, Serial No. 652,323 filed March 6, 1946, for Electrical cut-out, assigned to the same assignee as this application.

Objects of this invention are to provide a housed type of oil fuse cut-out which is so constructed that it will automatically open the circuit on overload and which may be opened manually under load and which is arranged to insure the immediate extinction of any arc that may be formed, either due to automatic or manual opening of the circuit.

Further objects are to provide an oil fuse cut-out which is equipped with a housing in which are located concentric cylinders formed of insulating material with stationary contacts carried on the inner side of the inner cylinder, with the cylinders open at their upper and lower ends and with the incoming leads positioned between the cylinders, thus affording a high degree of protection.

Further objects are to provide an oil fuse cutout in which a housing is provided with an open upper end through which a combined switch element and fuse carrier is adapted to be inserted in only one position corresponding to switch open position, which is provided with a cover portion adapted to close the open end of the housing and which has a yoke or bail-like member pivoted on the housing and provided with means for locking the cover to the housing, the yoke being so arranged that it coacts with manually operable means to prevent operation of the switch when the yoke is rocked downwardly to allow removal of the cover, the coaction of the combined switch element and fuse carrier and the housing being such as to prevent removal of the combined switch element and fuse carrier unless the parts are in open switch position.

Further objects are to provide a novel form of throw-out mechanism in which a floating lever assembly is employed and is spring urged in a manner to tension a fuse link when in circuit closed position and to throw out any remaining portions of the fuse link on rupture thereof and which coacts with the stationary contacts in a manner to provide a heavy yielding contact pressure between the floating lever assembly and the stationary contacts.

Further objects are to provide a fuse link throw-out construction for an oil switch which is so made that no tension is imposed on the fuse link when the switch is in switch open position, but is arranged to tension the fuse link when the switch is in closed position.

A further specific object of this invention is to provide a novel manner of mounting the stationary contacts so that they are firmly and securely mounted on the innermost part of two concentric insulating cylinders with the lead receiving portion of the contacts located between the cylinders.

Further objects are to provide an oil fuse cutout construction in which a very short fuse link is employed, in which there is no chance of any portion of the fuse link dropping downwardly after rupture of the fuse link, in which a short relatively heavy fiber or other insulating tubular member is provided for the fuse link and is carried in an insulating rotary combined switch element and fuse carrier, in which the tubular member which receives the fuse is open at both ends and is relatively short and insures extinction of the arc by the expulsion of the oil and gases from both ends of the tube while at the same time preventing the building up of excessive pressure within the tube.

Further objects are to provide a construction in which extreme rigidity and strength is obtained for the several parts of the device, in which the concentric insulating cylinders are securely held in a positive and rigid manner to the housing, in which adequate means are provided for protecting the tie bolts or other members that hold the concentric tubular cylinders in place, and in which there is no chance of the arc striking from any of the contacts to any of the metal portions of the housing or other parts of the apparatus.

Embodiments of the invention are shown in the accompanying drawings, in which:

Figure 5 is a sectional view on the line 5—5 of Figure 1.

Figure 6 is an enlarged fragmentary sectional view of the lower portion of the combined switch element and fuse carrier showing the parts in the position they occupy when in switch open position and when the fuse link is not ruptured.

Figure 7 is a view corresponding to Figure 6, however, showing the parts in the position they occupy in switch closed position.

Figure 8 is a view corresponding to Figure 7 showing the position of the parts after rupture of the fuse link.

Figure 9 is a view corresponding to Figure 7 showing a further form of combined switch element and fuse carrier showing the parts in the position they occupy when the switch is in closed position and when the fuse link is not ruptured.

Figure 10 is a face view of the movable contact assembly.

Figure 11 is a view corresponding to Figure 9 showing the parts in the position they occupy when the switch is in switch open position.

Figure 12 is a view corresponding to Figure 9 showing the switch in closed position and showing the position that the parts occupy when the fuse has been ruptured.

Figure 1:
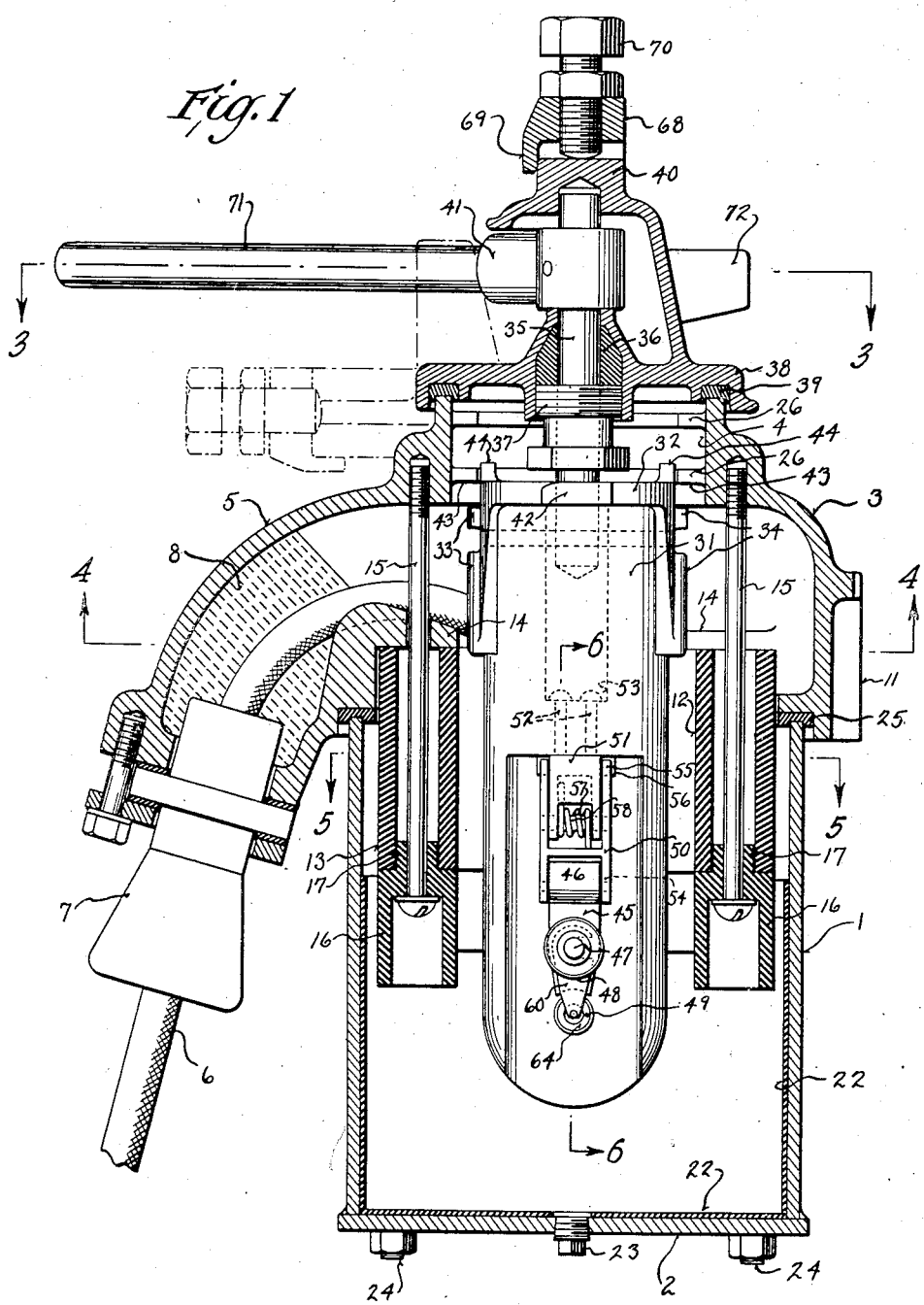
Figure 1 is a vertical sectional view on the line 1—1 of Figure 3, however, showing the yoke in its normal or vertical position.

Referring to the drawings, it will be seen that the electrical cut-out comprises a casing having a lower portion 1, a bottom portion 2 and an upper portion 3. The upper portion is provided with a circular opening 4 and with a laterally and downwardly extending portion 5 through which the leads or conductors 6 extend, such conductors projecting through suitable insulating bushings 7. It is preferable to at least partially fill the portion 5 with an insulating sealing compound indicated at 8. The housing is adapted to be filled with oil or other suitable insulating liquid to approximately the level indicated by the dotted line 9 in Figure 2, a suitable plug 10 being provided. The casing is equipped with any suitable means such as the feet 11, whereby it may be attached to a suitable support, not shown.

A pair of concentric insulating cylinders are positioned within the housing. The innermost cylinder is indicated by the reference character 12 and the outermost cylinder by the reference character 13. These cylinders are spaced apart and are open at their upper and lower ends. The upper ends of the cylinders bear against three or more inwardly projecting lugs 14 and are held against such lugs by means of tie bolts 15. The tie bolts or elongated screws 15 are provided at their lower ends with downwardly extending insulating sheath-like members 16 which have reduced portions 17 located in the space between the concentric cylinders 12 and 13 as shown most clearly in Figure 1. Thus the tie bolts are housed for the major part of their length jointly by the concentric cylinders and by the sheath or insulating thimbles 16.

Figure 2:
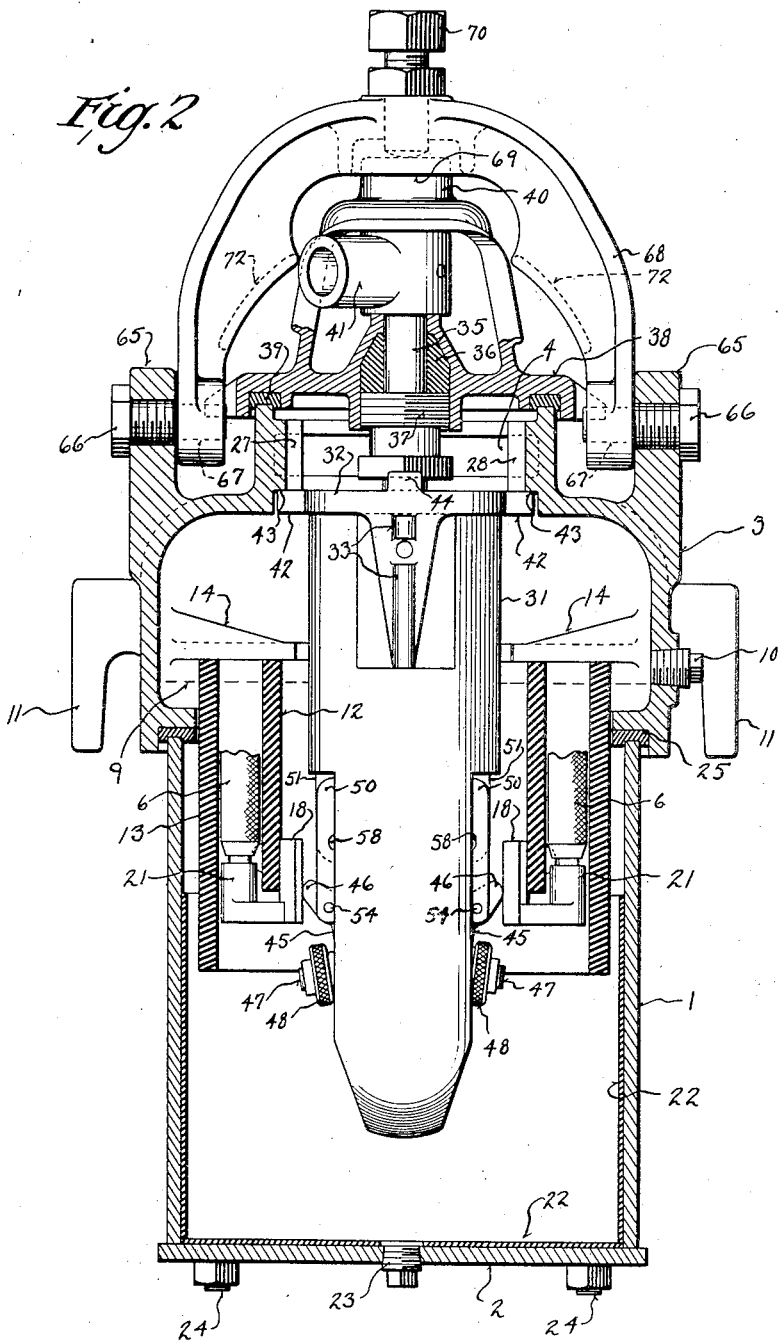
Figure 2 is a sectional view on the line 2—2 of Figure 3 and similarly to Figure 1 showing the yoke in its normal vertical position.

A pair of diametrically opposed stationary contacts 18 are positioned on the inner side of the innermost cylinder, as shown most clearly in Figures 2 and 5. These stationary contacts 18 are secured in place by means of screws 19 which extend from the outer side of the innermost insulating cylinder 12 into the stationary contacts 18. The stationary contacts 18, it will be noted, are extended in one direction and may be abruptly cut off in the other direction, as shown in Figure 5, so as to permit the free riding of the movable contacts over the extended portion of the stationary contacts 18 as will appear hereinafter. The extended portions or reduced portions of the stationary contacts 18 are indicated by the reference character 20, in Figure 5.

A further point to be noted in connection with the stationary contacts is that they are provided with outwardly and upwardly projecting extended portions arranged to receive the leads or conductors 6. These lead receiving portions of the stationary contacts 18 are indicated by the reference character 21, in Figures 2 and 5.

It will be seen from the description thus far given that the stationary contacts are mounted on the inner side of the innermost insulating cylinders and have integral projecting portions extending upwardly into the space between the concentric cylinders 12 and 13, see Figure 2, which portions receive the leads 6. From the above description it will be seen that the leads 6 are housed for the portion thereof adjacent the stationary contacts in the space between the concentric cylinders and consequently there is no chance of any arc reaching the leads. Further it is to be understood from reference to Figure 2, for instance, that the inner side of the lower portion 1 of the housing is lined with fiber or other suitable insulation indicated by the reference character 22. If desired, a drain plug 23 may be provided in the bottom portion 2 of the housing.

The component parts 1, 2, and 3 of the casing are held together by means of tie rods 24. The tie rods 24 are all located externally of the lower portion 1 of the casing and are threaded into the upper portion 3 thereof, as shown most clearly in Figure 4. It is preferable to provide a gasket 25 between the portion 1 and the portion 3 of the casing and to weld the bottom 2 to the lower portion 1 of the casing.

Figure 4:
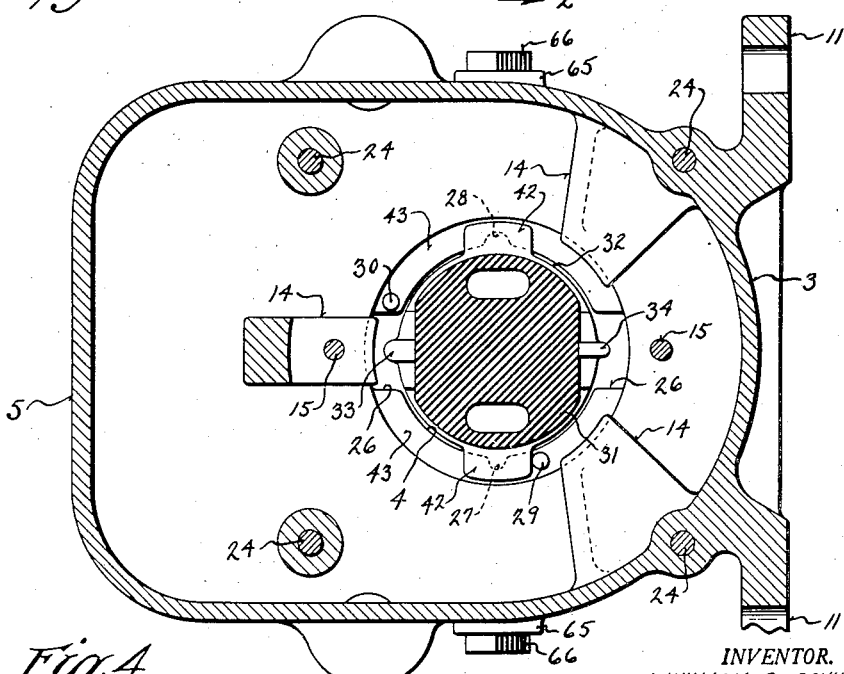
Figure 4 is a sectional view on the line 4—4 of Figure 1.

The upper portion 3 of the casing, as has been previously described, is provided with a circular opening 4. This opening has relatively large rectangular notches 26 formed at diametrically opposite points, as shown in Figure 4, and has a small notch 27 formed diametrically opposite a larger notch 28. The casing is also provided with stop pins 29 and 30, as shown in Figure 4, to define the amount of rotation allowed the combined fuse carrier and movable switch element constitutes the rotor portion of the device.

The movable contacts are carried by a rotor indicated generally at 31. This rotor is formed of insulating material and is adapted to be normally centrally located with reference to the concentric cylinders 12 and 13. It has an upper metal portion 32 and is provided with a relatively large rib 33 and a relatively smaller rib 34, see Figures 1 and 2, which are adapted to respectively pass through the notches 28 and 27, see Figure 4. The rotor is also provided with an upwardly projecting shaft 35 which passes through a packing gland composed of the packing 36 and the compression nut 37 carried by a head or cover 38 which is adapted to close the upper opening 4 in the casing, see Figures 1 and 2. Preferably, a gasket 39 is carried by the head 38 so as to seal against the upper edge of the casing when the head is forced downwardly by means hereinafter described. The upper end of the shaft is journaled in an overhanging portion 40 of the head 38 and is provided with a handle receiving socket member or hub 41 rigid with the shaft 35.

It is to be noted from Figures 1, 2, and 4 that the upper portion 32 of the rotor is provided with diametrically opposed outwardly projecting substantially rectangular lips 42 which are adapted to pass through the rectangular openings 26, see Figure 4, when the rotor is inserted into the casing. When the rotor is in place, these rectangular lips 42 ride beneath shouldered portions or overhanging portions 43 of the casing and thus prevent withdrawal of the rotor in all positions except when the lugs or ears 42 are in alignment with the notches 26. When the ears 42 are in alignment with the notches 26 the rotor is in switch open position and when the rotor has been rocked through 90 degrees to the position shown in Figures 1, 2, and 4, the rotor is in switch closed position.

Further it is to be noted from Figure 1 that the upper portion 32 of the rotor is provided with a pair of upstanding ears 44 which aid in centering the rotor while it is being moved to its final position during insertion and prior to the time that the head 38 of the rotor assembly is clamped tightly against the casing 3 in a manner hereinafter to appear. The movable contacts of the rotor assembly are shown most clearly in Figures 6, 7, and 8 and comprise a pair of floating levers 45 on opopsite sides of the rotor. These floating levers are provided with contact portions 46 adapted to engage the stationary contacts 18 when the rotor is rocked to switch closed position, as shown in Figure 7 for instance. The floating levers 45 carry at their lower ends fuse link receiving means consisting of the threaded studs 47 rigid with the levers 45 and provided with thumb nuts 48 for clamping the ends of the fuse link, indicated generally by the reference character 49, in place. The floating levers are carried by means of a pair of outwardly spring pressed supporting levers 50 pivotally supported from the rotor in brackets 51, secured to the rotor by means of screws 52, the screws 52 being located in recesses 53 formed in the rotor. The supporting levers 50 are pivoted to the floating levers at the free ends of the levers 50 by means of pivot pins 54. They are provided with upper ends 55 which are adapted to engage stops 56 formed integrally with the brackets 51 when the contacts 46 of the floating levers 45 are not in engagement with the stationary contacts 18, see Figure 6. Springs 57 are loosely coiled about the pivot pins 58 of the supporting levers 50 and urge the lower ends of the supporting levers towards outward rocking motion, thus tending to carry the pivot pins 54 of the floating levers 45 outwardly. The floating levers are provided with bearing portions 59 adjacent their lower ends arranged to contact with portions of the rotor 31 to limit the inward position of the lower ends of the levers 45.

The fuse link indicated generally at 49 is, as stated, very short in its total length. It is provided at one end with a rigid metal member 60 which is hook-shaped, as may be seen from Figure 1. At its other end it is provided with a flexible leader 61. The leader 61 and the rigid member 60 are adapted to be clamped in place on the levers 45 by means of the thumb nuts 48. The intermediate portion of the fuse link has a very short fusible section 62 and a strain wire 63. The fusible section of the fuse link is housed within a fiber tube 64 carried by the rotor 31 and extending transversely of the rotor. The rotor 31 is preferably of oil impregnated wood, whereas the fuse tube 64 is preferably formed of fiber to aid in the extinction of the arc upon rupture of the fuse link in a well known manner. However, it is obvious that the materials of which the fuse tube 64 and the rotor 31 are composed may be varied if desired.

It is to be noted that the fuse tube 64 is an expulsion fuse tube and is open at both ends so as to allow expulsion of oil and gas from both ends of the tube on rupture of the fuse link on overload. It is apparent, therefore, that this device can withstand extremely heavy overloads without generating excessive pressure within the short expulsion fuse tube 64.

When the switch is in open position, the movable contacts occupy the position shown in Figure 6. When the switch is in closed position, the movable contacts occupy the position shown in Figure 7. It will be seen that the contact portions 46 of the floating levers 45 are pressed against the stationary contacts 18 and thus secure a high contact pressure at the same time the fuse link is tensioned. In the event an overload occurs, the fuse link is ruptured and the floating levers rock to the position shown in Figure 8, extracting any remaining portion of the fuse link and assisting in clearing the circuit. In addition to this, there is an expulsion action. The oil and generated gases are expelled from the expulsion tube 64 and further assist in extinguishing the resulting arc.

It is to be noted particularly that when the switch is in open position the parts occupy the positions shown in Figure 6 and there is no tension on the fuse link. However, when the switch is rocked to closed position, the parts occupy the positions shown in Figure 7 and the fuse link is placed under tension.

The switch may also be manually opened under load as the break occurs beneath the oil level and the arc is quickly extinguished. This manual opening of the switch is secured by rotating the rotor 31 about its axis.

Figure 3:
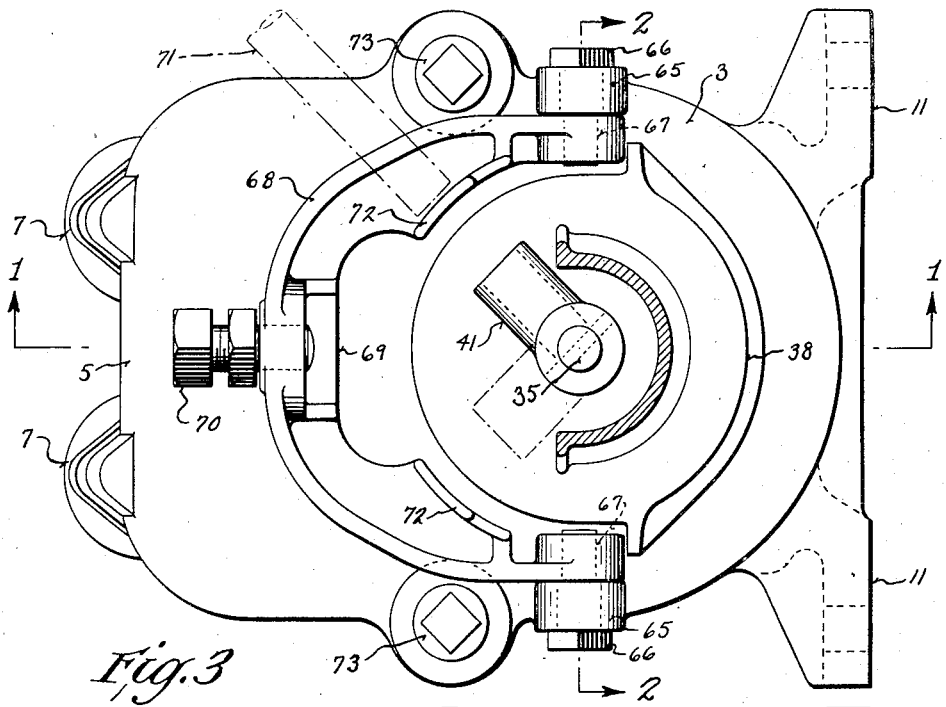
Figure 3 is a sectional view on the line 3—3 of Figure 1, however, showing the yoke rocked downwardly to its horizontal position.

Attention is now directed to Figures 1, 2, and 3. It will be seen that the portion 3 of the casing is provided with a pair of upstanding ears or lugs 65 which carry pivot pins or screws 66. These pivot members 66 have reduced portions 67 on which the arms of a bail or yoke member 68 are pivotally mounted. This yoke is provided with a downwardly extending flange 69 which is arranged to contact with the upper portion 40 of the head 38, see Figure 1, when an attempt is made to rock the yoke or bail member 68 in a clockwise direction as viewed in Figure 1. However, the bail may be rocked in a counter-clockwise direction, as viewed in Figure 1. When the bail or yoke is in vertical position a pressure screw 70 is arranged to be screwed down to force the head or cover portion 38 into tight, sealing relation with the portion 3 of the casing. When the parts are in this position with the bail vertical, it is clear that the operating handle 71 may be inserted into the handle receiving hub portion 41 and the switch may be moved manually to either open or closed position by rotating the rotor 31. However, when the bail or yoke 68 is rocked downwardly into the dotted line position shown in Figure 1 and the full line position shown in Figure 3, it is clear that the two upstanding ears or portions 72 formed integrally with the yoke 68 prevent the insertion of the handle 71 into the handle receiving socket 41 in either switch open or switch closed position and consequently it is impossible to operate the switch when the bail is in its horizontal position, as shown in full lines in Figure 3 or in dotted lines in Figure 1.

Further it is to be noted from reference to Figures 1, 2, and 4 that the combined rotor and fuse carrier cannot be removed from the casing, although the bail 68 may be rocked downwardly to its horizontal position, as long as the switch is in closed position as the lugs 42 are locked beneath the shouldered portions 43 of the casing and consequently preclude the removal of the rotor. When it is desired to remove the rotor it is necessary to first rock the switch to switch open position so that the lugs 42 are in alignment with the rectangular notches 26. Thereafter the handle is removed, the pressure screw 70 is loosened and the bail 68 is rocked to its horizontal position. The rotor may be lifted directly upwardly from the casing. It may be refused and reinserted into the casing. However, the switch cannot be rotated to switch closed position as one of the ears 72 is in front of the handle receiving portion 41, see Figure 3. It is necessary to rock the bail to its vertical position before the handle can be inserted in the handle receiving portion 41. Consequently, there is no danger of the operator closing the switch until the bail has been rocked to its vertical position. The natural procedure, therefore, consists of the rocking of the bail to its vertical position at which time the pressure screw 70 is again tightened to firmly hold the head 38 in sealing relation to the casing. Thereafter, the handle 71 is inserted in the handle receiving portion 41 and the switch is rocked to switch closed position.

It is obvious that, if desired, the casing may be completely sealed from communication with the outside air as has been shown in the drawings. The casing is provided with a pair of removable screw plugs 73, see Figure 3. One or both of these screw plugs may be removed and a cushioning chamber or cushioning chambers may be screwed into the resulting opening. In place of this a suitable vent pipe or vent pipes may replace one or both of the screw plugs 73, respectively. Inasmuch as both of these features, namely, the vent pipe and the cushioning chamber are old in the art, such construction has not been shown.

Referring to Figures 9 through 12 it will be seen that this form of the invention is very similar in principle to that previously described and operates in very much the same way as that previously described. The movable contacts are indicated by the reference characters 74 and are carried by the heavy spring members 75. Preferably the spring members 75 are slotted as indicated at 76 in Figure 10. The floating throw-out levers of the movable contact assemblies are indicated by the reference character 77 and are pivoted as indicated at 78 on the ears 79 carried by springs 80. The springs 80 and 75 are held in place by means of the screws 52. The floating pivoted levers 77 are provided with screws 81 and with thumb nuts 82 which serve to clamp opposite ends of the fuse link. It is to be noted that a flexible conducting braid 83 is held beneath the heads 74 of the movable contacts and beneath the heads of the screws 81 so as to afford excellent electrical connection between the movable contacts 74 and the throw-out levers 77. This braid may be formed of a strip looped about the head of the screw 81 and having its ends clamped beneath the heads 74 of the movable contacts. The intermediate portion of the braid 83 is overlapped and passes through an opening 84 in the corresponding throw-out lever 77, see Figure 10. The floating throw-out levers 77 are provided with rounded upper ends 85 which bear against the inner side of the main contact springs 75.

The fuse link may be constructed as previously described and extends through the tube 64. When the fuse link ruptures on overload any remaining portion thereof is pulled out or thrown out as previously described. Also the expulsion action and the extinguishing action due to the oil takes place as previously described.

It is to be noted from Figure 11 that when the switch is in open position that there is no stress on the fuse link. The springs 75 and 80 move outwardly to the position shown in Figure 11. However, when the switch is moved to closed position as shown in Figure 9 the contacts 74 are forced inwardly and move the upper ends 85 of the floating throw-out levers 77 inwardly. This moves the pivot points 78 of the throw-out levers 77 inwardly and moves the springs 84 inwardly and thus tensions the fuse link. Upon rupture of the fuse link the parts assume the position shown in Figure 12 and it will be seen that firm contact between the movable contacts and the stationary contacts is maintained although the springs 80 have moved outwardly and have consequently caused the throw-out levers 77 to pull out or throw out any remaining portion of the fuse link.

It will be seen that a novel type of electrical cut-out construction of the oil fuse type has been provided by this invention which may be manually opened under load or which may be automatically opened under load with the assurance that any resulting arc will be quickly extinguished.

Further it is obvious that the device is wholly safe in use as it is impossible for the operator to either open or close the switch when the bail or yoke is in horizontal position. Access to the handle receiving portion can be had only when the bail is in its vertical position. In addition to this, the combined rotor and fuse carrier can be inserted in only one position and when moved to switch closed position it cannot be lifted from the casing although the bail may be in horizontal position. Thus a full degree of safety is provided for the operator.

It is also clear that the novel arrangement of concentric insulating cylinders, the innermost of which carries the stationary contacts, provides for the free circulation of oil upon rupture of the fuse link or manual opening of the circuit, as these cylinders are open at their top and bottom. In addition to this, the peculiar relation between the arrangement of the leads and the concentric insulating cylinders protects the leads.

It is to be noted that the total length of the fuse link between the lower ends of the floating levers or throw-out levers is less than the distance from either of these levers to the bottom of the casing. Thus it is clear that there is no chance of any dangling portion of the fuse link shorting to the bottom of the casing when the fuse link is ruptured on overload.

It will be seen further that the device is easy to operate as no pressure is imparted to the vertical shaft of the rotor by the pressure screw of the yoke or bail portion.

It is to be noted particularly that in both forms of the invention when the switch is in open position, the fuse link is not tensioned. However, when the switch is rocked to closed position the fuse link is placed under tension and the parts are in position to execute the throw-out or pull-out action on the fuse link in the event of rupture on overload.

Although this invention has been described in considerable detail, it is to be understood that such description is intended as illustrative rather than limiting, as the invention may be variously embodied and is to be interpreted as claimed.

I claim:

1. An oil switch construction comprising a casing adapted to contain oil, a pair of concentric cylinders of insulating material carried by said casing and having a portion at least projecting into the oil, a pair of stationary contacts carried on the inner side of the inner cylinder, leads extending downwardly in the space between the cylinders and electrically connected to the stationary contacts, an insulating rotor revolubly supported inside of said inner cylinder, and a pair of electrically connected movable contacts carried by said rotor and arranged to engage and disengage said stationary contacts when said rotor is turned to first or a second position, respectively.

2. An oil switch construction comprising a casing adapted to contain oil, a pair of concentric cylinders of insulating material carried by said casing and located within the oil, said cylinders being open at their upper and lower ends for the major portion of their extent and said cylinders being spaced from the bottom of said casing, a pair of stationary contacts carried on the inner side of the inner cylinder, leads extending downwardly between said cylinders and connected to said stationary contacts, an insulating rotor revolubly supported inside said cylinders, electrically connected movable contacts carried by said rotor and arranged to engage and disengage said stationary contacts when said rotor is rotated to a first or a second position, respectively, and means located externally of said casing for rotating said rotor.

3. An oil switch construction comprising a casing adapted to contain oil, a pair of concentric cylinders of insulating material carried by said casing and located within the oil, said cylinders being open at their upper and lower ends, tie rods attached at their upper ends to the casing and extending between said cylinders for holding said cylinders in place, insulating thimbles surrounding the lower ends of said tie rods and bearing against the lower portions of said cylinders, stationary contacts mounted on the inner side of the inner cylinder, a rotor of insulating material revolubly supported inside the inner cylinder and having a pair of electrically connected movable contacts arranged to engage and disengage said stationary contacts when said rotor is rotated to a first or a second position respectively, and means for rotating said rotor.

WILLIAM O. SCHULTZ.

No references cited.